United States Patent [19]
Tambe

[11] Patent Number: 5,617,447
[45] Date of Patent: Apr. 1, 1997

[54] METHOD OF STABILIZING A POWER SUPPLY NETWORK AGAINST REACTIVE LOAD FLUCTUATIONS, AND A REACTIVE POWER COMPENSATION DEVICE

[75] Inventor: Shripad Tambe, Baden, Switzerland

[73] Assignee: ABB Management AG, Baden, Switzerland

[21] Appl. No.: 539,958

[22] Filed: Oct. 6, 1995

[30] Foreign Application Priority Data

Oct. 12, 1994 [DE] Germany ............... 44 36 353.2

[51] Int. Cl.$^6$ ............... H05B 7/144
[52] U.S. Cl. ............... 373/108; 373/102; 323/211
[58] Field of Search ............... 373/102–108; 323/211

[56] References Cited

U.S. PATENT DOCUMENTS

| | | | |
|---|---|---|---|
| 4,698,581 | 10/1987 | Shimamura et al. | 323/211 |
| 5,155,740 | 10/1992 | Ao et al. | 373/108 |
| 5,351,267 | 9/1994 | Strebel | 373/105 |
| 5,463,653 | 10/1995 | Du Parc et al. | 373/108 |

FOREIGN PATENT DOCUMENTS

| | | |
|---|---|---|
| 0192568 | 8/1986 | European Pat. Off. . |
| 0498239 | 8/1992 | European Pat. Off. ............... 373/108 |
| 0639880 | 2/1995 | European Pat. Off. . |

OTHER PUBLICATIONS

"Transient AC/DC Simulator and Field Tests of the Closed Loop Control of the Pelham SVCS'" Welsh et al., Fifth European Conference on Power Electronics and Applications, Bd. 8, 13.—Sep. 16, 1993 Brighton Conference Center.

Primary Examiner—Tu B. Hoang
Attorney, Agent, or Firm—Burns, Doane, Swecker & Mathis

[57] ABSTRACT

When operating, DC arc furnaces generate undesired reactive load fluctuations which are compensated without special compensation reactance by a reactive power controller. As compensation reactance, use is made of inductors, which are always present and via which the arc furnace is fed by rectifiers. A current controller is connected to the rectifiers via a first summer. On the input side, the first summer is further operationally connected to the output of the reactive power controller and, as the case may be, to an AC—AC converter which supplies a signal proportional to the power supply voltage ($U_{xN}$). In addition, it is possible to provide an inverter which is connected in parallel with the arc furnace on the DC side and which is operationally connected on the AC side to a feeding AC power supply network (N) via a stabilization transformer or via auxiliary windings of a furnace transformer, and to the output of the reactive power controller on the control side. On the output side, the reactive power controller can further be operationally connected to the current controller via a second summer.

17 Claims, 1 Drawing Sheet

METHOD OF STABILIZING A POWER SUPPLY NETWORK AGAINST REACTIVE LOAD FLUCTUATIONS, AND A REACTIVE POWER COMPENSATION DEVICE

BACKGROUND OF THE INVENTION

1. Field of the Invention

The invention relates to a method for stabilizing a power supply device or a power supply network against reactive load fluctuations of at least one electric load having a variable reactive load, and to a reactive power compensation device.

2. Discussion of Background

U.S. Pat. No. 5,155,740 discloses a flicker compensation device for DC arc furnaces, in which reactive power control is performed only as a function of the detected reactive power of the arc furnace.

In the case of this compensation, no account is taken of currents in filter branches and auxiliary equipments. In the case of small electrode currents, the reactive power of the furnace can become too low. When there are permanently installed capacitor banks, this leads to overcompensation, which is frequently not accepted by power supply companies.

EP-A1-0 498 239 discloses controlling an arc furnace by means of DC feed having 2 control loops. A current controller ensures a constant current corresponding to a prescribed desired current value. An electrode control loop influences the position of the electrode, and thus the arc length. In the event of lengthening of the arc, the current controller must increase the voltage or drive the rectifier in such a way that the current remains constant. However, this is only possible as long as there is a voltage reserve. Controlling the electrode is performed by means of an adaptable DC voltage controller. The arc voltage, which is fed via a damping element to a comparator or summer, serves as the actual DC voltage value. The desired DC voltage value must be calculated in each case taking account of the transformer voltage stage and of the electrode current for each working point. Firstly, a limiter is used to impose a limit in accordance with the transformer stage of the power converter transformer, and thus with the possible voltage range of the power converter, in such a way that the power converter is operated in a steady-state fashion at most just below the rectifier limit. The desired value is fed in a smoothed fashion to the summer, in order in the event of sudden changes in the desired voltage value not to obtain any overshooting of the actual value, which could effect interrupting of the arc. Nothing is stated there about compensating reactive power fluctuations.

SUMMARY OF THE INVENTION

The invention achieves the object of further developing methods and reactive power compensation devices for stabilizing a power supply device or a power supply network against reactive load fluctuations of at least one electric load having a variable reactive load of the type mentioned at the beginning in such a way that reactive load fluctuations can be compensated with less expenditure.

An advantage of the invention that the rectifier for feeding the installation need be designed only for a portion of the reactive load. No special compensation reactance is required for reactive power compensation. The inductors or reactances present in series with the load are used instead of special compensation reactances, with the result that costs can be reduced and the entire installation becomes less expensive.

In accordance with an advantageous embodiment of the invention, no additional hardware is required for reactive power compensation by comparison with uncompensated installations. A satisfactory reactive power control can be achieved subsequently in existing installations by exchanging a computer program.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, which shows a DC arc furnace having a current control loop and a reactive power control loop.

DESCRIPTION OF THE PREFERRED EMBODIMENT

Figure 1:
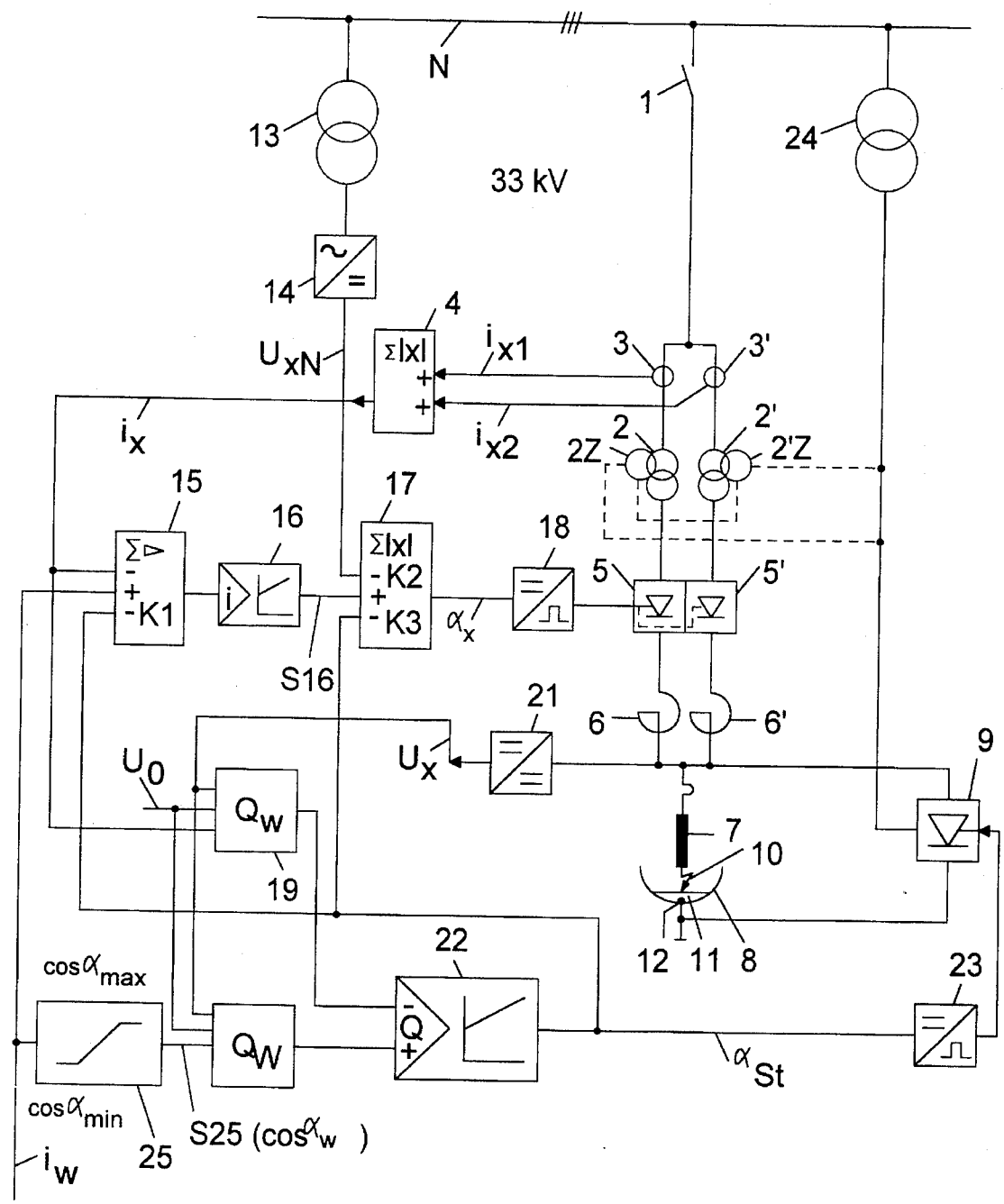

Referring now to the drawing, for the sake of simplicity signals and their assigned values or magnitudes are denoted below in the same way.

The single figure shows a DC arc furnace or arc furnace (8) having an electrode or cathode (7) which via 2 reactive elements or inductors (6, 6'), which are connected in series in parallel branches respectively to a rectifier (5, 5'), a furnace transformer (2, 2') having a plurality of switching stages, and to a current transformer (3, 3'). The current transformers (3, 3') are connected to an AC power supply network (N) having an AC voltage of 33 kV via a switch (1). A 2nd electrode or anode (12) arranged in the bottom region of the arc furnace (8) is connected to the positive terminal of the rectifier (5) (not represented). An arc (10) burns between the lower end of the cathode (7) and a material or scrap to be melted (not represented) as well as with the surface of a melt or of a molten bath (11).

Partial current actual value signals ($i_{x1}$, $i_{x2}$) are detected by means of the current transformers (3, 3') in the AC supply leads to the rectifiers (5, 5') and fed to non-negating inputs of a 3rd summer (4) which adds the absolute values of its input variables and on the output side supplies a current actual value signal ($i_x$), where $i_x=|i_{x1}|+|i_{x2}|$, to a negating input of a 2nd summer (15) and to a function generator (19) for a reactive power actual value signal ($Q_x$). A prescribable current desired value signal ($i_w$) is fed, for example from a potentiometer (not represented), to a non-negating input of this 2nd summer (15) and to a function generator (25) for calculating a modified, limited current desired value signal (S25). From the output of a reactive power controller (22) to a further negating input of the 2nd summer (15) is fed a stabilization striking angle signal ($\alpha_{St}$) which is multiplied in the 2nd summer (15) by a prescribable factor (K1), where: $0<K1<0.4$.

On the output side, the summer (15) is connected to a current controller (16) having a proportional-integral characteristic, which is operationally connected on the output side to a non-negating input of a 1st summer (17). In a fashion proportional to the amplitude of the voltage of the AC power supply network (N) there is fed, via a transformer (13) connected to the AC power supply network (N) and an AC—AC converter (14), to a negating input of this 1st summer (17) a rectified power supply voltage signal ($U_{xN}$) which is multiplied in the 1st summer (17) by a prescribable factor (K2), where: 0<K2<0.5. Fed to a further negating input of the 1st summer (17) is the stabilization striking angle signal ($\alpha_{St}$), which is multiplied in the 1st summer (17) by a prescribable factor (K3) where: 0<K3<0.4. On the output side, the 1st summer (17) supplies a rectifier manipulated variable signal ($\alpha_x$), in accordance with a striking angle, to an ignition pulse transformer (18) which controls the rectifiers (5, 5') on the output side.

A DC—DC converter (21), which is electrically connected on the input side to the current lead of the cathode (7), detects a DC voltage or arc voltage ($U_x$) of the arc furnace (8). It is operationally connected on the output side to the function generators (19) and (20). Also fed to the function generator (19), in a fashion corresponding to a rectified power supply voltage ($U_{xN}$) without a load on the AC power supply network (N), is a DC voltage constant ($U_0$) which is prescribable or is supplied by a master control (not represented).

The function generator (19) supplies on the output side, as a function of its input signals, a signal proportional to the reactive power actual value ($Q_x$), doing so in accordance with:

$$Q_x = U_0 \cdot i_x \cdot [1-(U_x/U_0)2]0.5,$$

which signal is fed to a negating input of the reactive power controller (22).

The function generator (25) supplies the output signal (S25) to the function generator (20), which is proportional to $\cos(\alpha_w)$, ($\alpha_w$) denoting a striking angle desired value. It holds for a current desired value signal $i_w=0$ to $i_w=i_{max}/2$ that $\cos(\alpha_w)=\cos(\alpha_{min})$, ($\alpha_{min}$) being a prescribable minimum striking angle. It holds for a current desired value signal $i_w > i_{max}$ that $\cos(\alpha_w)=\cos(\alpha_{max})$, ($i_{max}$) being a maximum permissible current value for the arc furnace (8), and ($\alpha_{max}$) being a prescribable maximum striking angle. It holds for $0<i_w<i_{max}$ that $\cos(\alpha_w)=m \cdot i_w+\cos(\alpha_{min})$, it being the case that $m=[\cos(\alpha_{max})-\cos(\alpha_{min})]/(0.5 \cdot i_{max})$.

The function generator (20) delivers on the output side, as a function of its input signals, a signal proportional to the reactive power desired value ($Q_w$), doing so in accordance with:

$$Q_w = U_0 \cdot i_w \cdot [1-(\cos(\alpha_w))2]0.5,$$

which signal is fed to a non-negating input of the reactive power controller (22).

On the output side, the reactive power controller (22) is connected via an ignition pulse transformer (23) to the control inputs of a 3-phase inverter (9) which is connected on the DC voltage side to the electrodes (7, 12) of the arc furnace (8), and on the AC voltage side to the AC power supply network (N) via a 3-phase stabilization transformer (24).

Instead of the stabilization transformer (24), use can be made of a furnace transformer (2, 2') having 2 secondary-side auxiliary windings (2Z) and (2'Z) which are connected to one another in series, as is indicated by dashes. Space and costs can be saved in this way.

Reactive power can be supplied to the AC power supply network (N) or drawn therefrom by means of the inverter (9). No additional reactance is required for this purpose, since the inductors (6, 6') which are present are also used as reactance for the reactive power compensation.

A very effective reactive power compensation with a reduction of a flicker amplitude by approximately 20%, which was determined by means of a computer simulation, is already achieved with K1=K2 =0, the transformer (13) and the AC—AC converter (14) being dispensable.

On the other hand, a satisfactory reactive power compensation is also achieved when, in addition, the inverter (9), the ignition pulse transformer (23) and the stabilization transformer (24) or the auxiliary windings (2Z) and (2'Z) on the furnace transformer (2, 2') are lacking.

The greatest success in reducing a flicker amplitude by approximately 40% is achieved when all the measures in accordance with the diagrammatic circuit of FIG. 1 are applied.

It goes without saying that the summer (4) can be omitted and the partial current actual value signals ($i_{x1}$, $i_{x2}$) can be fed separately to the summer (15) and the function generator (19), the sum then being formed there.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for stabilizing an AC power supply network (N) against reactive load fluctuations of at least one electric load having a variable reactive load, comprising the steps of:
    a) controlling a current intensity of the load to a desired current value using a current controller in a first control loop, which includes the load as a controlled system, and at least one power converter; and
    b) controlling reactive power of the load to a desired reactive power value using a reactive power controller in a third control loop which includes the load as a controlled system, said step of controlling a reactive power further including at least one of the following steps:
    c) multiplying an output signal of the reactive power controller by a first factor and adding the output signal to at least one input variable of the current controller; and
    d) multiplying the output signal of the reactor power controller by a third factor and adding the output signal to at least one output variable of the current controller.

2. The method recited in claim 1, wherein the first factor is in a range of 0 to 0.4.

3. The method recited in claim 1, wherein the third factor is in a range of 0 to 0.4.

4. The method recited in claim 2, wherein the third factor is in a range of 0 to 0.4.

5. The method recited in claim 1, further comprising a step of:
    multiplying a power supply voltage of the AC power supply network by a second factor to produce a product which is added to the at least one output variable of the current controller.

6. The method recited in claim 4, further comprising a step of:
    multiplying a power supply voltage of the AC power supply network by a second factor to produce a product which is added to the at least one output variable of the current controller.

7. The method recited in claimed in claim 5, wherein the second factor is in a range of 0 to 0.5.

8. The method recited in claim 1, wherein said step of controlling a reactive power further includes a step of:
    controlling the reactive power as a function of the output signal of the reactive power controller in a second control loop which includes the load as a controlled system, to the desired reactive power value by at least one additional power converter.

9. The method recited in claim 6, wherein said step of controlling a reactive power further includes a step of:

controlling the reactive power as a function of the output signal of the reactive power controller in a second control loop which includes the load as a controlled system, to the desired reactive power value by at least one additional power converter.

10. A method for stabilizing an AC power supply network against reactive load fluctuations of at least one electric load having a variable reactive load, comprising the steps of:

a) controlling a current intensity of the load to a desired current value using a current controller in a first control loop, which includes the load as a controlled system, and at least one power converter; and b) controlling reactive power of the load to a desired reactive power value using a reactive power controller in a third control loop which includes the load as a controlled system, said step of controlling a reactive power further including a step of:

c) controlling the reactive power as a function of an output signal of the reactive power controller in a second control loop, which includes the load as a controlled system, to the desired reactive power value by at least one additional power converter.

11. A reactive power compensation device comprising:

a) at least one electric load having a variable reactive load;

b) at least one power converter for operationally connecting the electric load to an AC power supply network;

c) a current controller which is connected on an output side to the at least one power converter via a first summer; and d) a reactive power controller which is connected on an output side to a reactive power compensation device that includes the power converter, wherein the reactive power controller is configured to include at least one of:

e) a connection on the output side directly to one input of the first summer; and f) a connection on the output side directly to one input of a second summer to which desired and actual current values are supplied via at least one further input, an output of the second summer being connected to the current controller.

12. The reactive power compensation device recited in claim 11, wherein the first summer is operationally connected on an input side to the AC power supply network via a separate alternating voltage converter.

13. The reactive power compensation device recited in claim 12, further comprising:

a) a separate second power converter;

b) connected in parallel with the load on a DC side;

c) operationally connected on an AC side to the AC power supply network; and d) operationally connected on a control side to the output side of the reactive power controller.

14. The reactive power compensation device recited in claim 11, further comprising:

a) a separate second power converter;

b) connected in parallel with the load on a DC side;

c) operationally connected on an AC side to the AC power supply network; and d) operationally connected on a control side to the output side of the reactive power controller.

15. The reactive power compensation device recited in claim 14, further comprising:

a) at least one transformer for operationally connecting the at least one power converter to the AC power supply network;

b) the at least one transformer further including at least one auxiliary winding on a secondary side;

c) which is electrically connected to AC inputs of the separate second power converter.

16. A reactive power compensation device comprising:

a) at least one electric load having a variable reactive load;

b) at least one power converter for operationally connecting the electric load to an AC power supply network;

c) a current controller which is connected on an output side to the at least one power converter via a first summer;

d) a reactive power controller which is connected on an output side to a reactive power compensation device that includes the power converter; and e) a separate second power converter;

f) connected in parallel with the load on a DC side;

g) operationally connected on an AC side to the AC power supply network; and h) operationally connected on a control side to an output of the reactive power controller.

17. The reactive power compensation device recited in claim 16, further comprising:

a) at least one transformer for operationally connecting the at least one power converter to the AC power supply network;

b) the at least one transformer further including at least one auxiliary winding on a secondary side;

c) which is electrically connected to AC inputs of the separate second power converter.

* * * * *